United States Patent [19]

Maitani et al.

[11] 4,080,612
[45] Mar. 21, 1978

[54] DATA DISPLAY FOR STROBO UNIT

[75] Inventors: Yoshihisa Maitani, Hachioji; Osamu Kawarada, Fuchu, both of Japan

[73] Assignee: Olympus Optical Co., Ltd., Tokyo, Japan

[21] Appl. No.: 736,567

[22] Filed: Oct. 28, 1976

[30] Foreign Application Priority Data

Nov. 6, 1975    Japan .................... 50-150859[U]

[51] Int. Cl.² ...................... G03B 15/02; G03B 17/00
[52] U.S. Cl. ................................... 354/126; 354/289
[58] Field of Search ............... 354/32, 33, 34, 35, 354/126, 127, 288, 289, 295, 128

[56] References Cited

U.S. PATENT DOCUMENTS

| 3,742,824 | 7/1973 | Ueda et al. | 354/289 |
| 3,956,763 | 5/1976 | Yamanaka | 354/289 |

FOREIGN PATENT DOCUMENTS

| 2,245,870 | 9/1972 | Germany | 354/126 |

Primary Examiner—L. T. Hix
Assistant Examiner—M. L. Gellner
Attorney, Agent, or Firm—Ostrolenk, Faber, Gerb & Soffen

[57] ABSTRACT

A data display for use in a strobo unit which includes a manual controlling device for manually controlling the illumination, an automatic controlling device for controlling the illumination by means of a light receiving element which serves as means for determining an external light, and a TTL controlling device for controlling the illumination by means of a second light receiving element disposed within the camera for determining reflected light from a shutter blade or a film surface. The data display comprises a first stationary display panel carrying a diaphragm aperture dial and a guide number dial for use in a manual control mode, a diaphragm aperture dial and a range dial for use in an automatic control mode, and a plurality of indicia for selection of the manual, automatic and TTL controlling devices, all disposed in interrelated and concentric relationship. The data display also comprises a second stationary display panel disposed in concentric relationship with the first stationary display panel and carrying a dial thereon which indicates the distance to which a photographing operation is possible during the TTL control mode. Additionally, the data display also comprises a first mask plate which is disposed in concentric relationship with the first stationary display panel and rotatable relative thereto, a second mask plate which is rotatable relative to the first mask plate, but rotates integrally with the latter as it rotates, and a third mask plate which is disposed for integral rotation with the first mask plate.

2 Claims, 12 Drawing Figures

DATA DISPLAY FOR STROBO UNIT

BACKGROUND OF THE INVENTION

The invention relates to a data display for a strobo unit.

The illumination of a strobo unit can be controlled in the following three manners: (1) the duration of the flash from the strobo unit may be maintained constant while a diaphragm aperture on the part of a camera can be controlled in accordance with the relationship between a guide number and a distance (this being referred to as a manual control); (2) a light receiving element may be disposed in one unit with the strobo unit for determination of an external light, and the output signal from the element is used to control the duration of the flash from the strobo unit (hereafter referred to as an automatic control); and (3) a light receiving element may be disposed within a camera for receiving reflected light from a shutter blade or a film surface, and the output signal from the element is used to control the duration of the flash from the strobo unit (hereafter referred to as TTL control).

An arrangement used for performing the automatic control is commonly referred to as an automatically controlled strobo unit or auto strobo. This comprises a light receiving element which is disposed either in one unit with the strobo unit or detachably mounted on the strobo unit or on the external portion of the camera body. Light from an object being photographed directly impinges on the element, which produces an output signal to provide an automatic control of the duration of the flash. However, the automatic control suffers from certain difficulties in that a diaphragm aperture on the part of the camera is limited to a particular range and that an error may be caused in the control of the flash time because of the photometry which is directed not to light paassing through the taking lens. These difficulties can be overcome by the provision of a light receiving element within the body of the camera for receiving reflected light from a shutter blade or a film surface in order to control the flash time in accordance with an output signal from this element. This type of control is known as the TTL control which is most ideal in providng a proper exposure. However, the TTL control can only be utilized in a camera which is provided with a light receiving element in the interior thereof.

On the other hand, it will be appreciated that it is sometimes more appropriate, depending on the type of objects being photographed, to determine a diaphragm aperture by a manual control or in accordance with the relationship between the guide number and the distance.

In view of the foregoing, it is desirable to provide a strobo unit which can be operated according to either one of the manual, automatic or TTL control and to enable a particular one of these control schemes depending on a particular situation of taking pictures. This, however, entails the necessity to display various data involved with the individual control schemes. There has been no strobo unit which includes a combination of these three types of strobo controlling devices, principally because of the difficulty encountered in presenting different kinds of data which are associated with these control schemes.

SUMMARY OF THE INVENTION

It is an object of the invention to provide a data display for a strobo unit capable of controlling the illumination of the strobo unit in either one of a manual, an automatic and a TTL control scheme.

The data display according to the invention comprises stationary display panels which carry necessary data thereon, and three mask plates which cooperate with each other to provide a selective display of an intended data presentation. A feature of the invention is to enable data associated with the TTL control to be displayed, and another feature relates to the simplicity of the required operation. A display of data associated with the manual, automatic and TTL control in one unit is for the first time made possible by the present invention.

DETAILED DESCRIPTION OF PREFERRED EMBODIMENT

Figure 1:
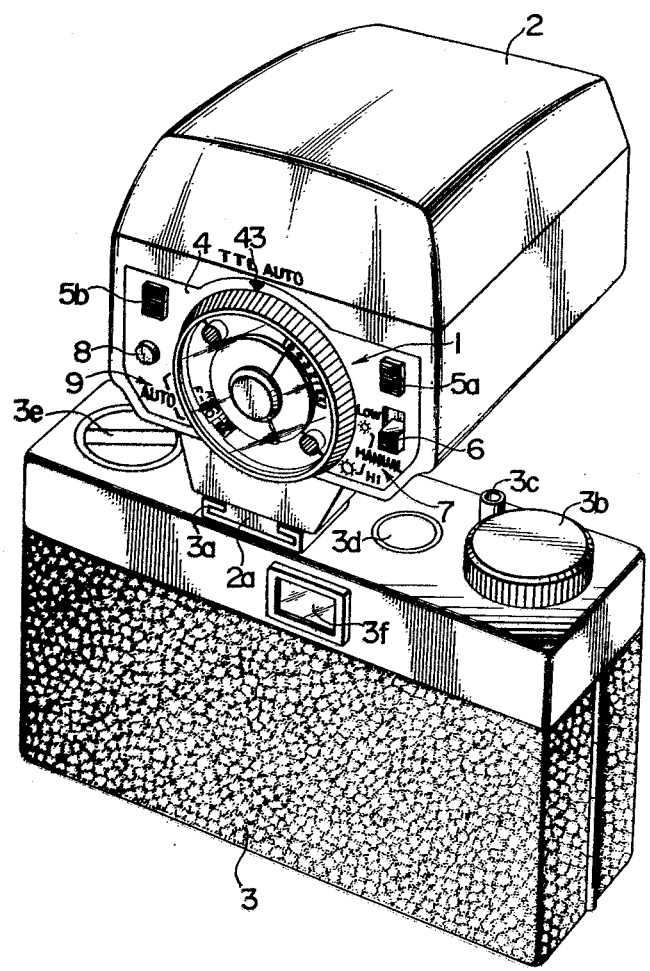
FIG. 1 is a perspective view of a strobo unit incorporating a data display according to the invention, as mounted on a camera.

Referring to FIG. 1, a strobo unit 2 incorporating a data display 1 constructed in accordance with one embodiment of the invention is shown as mounted on a camera 3. The strobo unit 2 is mechanically and electrically connected with the camera 3 by having its leg 2a mounted on a hot shoe 3a of the camera 3. Under this condition, the data display 1 is situated on the rear side of the camera 3 while the light emitting portion, not shown, of the strobo unit 2 is located on the front side of the camera 3.

On the surface of the studio unit 2 on which the data display 1 is provided, there is a fist stationary display panel 4 which is integral with the rear surface of unit 2. Located on the right-hand side of the display panel 4 are a charging indicator 5a, a power switch 6 and indicia 7 representing light output levels which are switched in a manual control mode while located on the left-hand portion thereof are an automatic control indicator 5b, a test button 8 for testing the illumination and indicia 9 representing light output levels which are switched in an automatic control mode.

The indicia 7 include a designation "MANUAL" while the indicia 9 include a designation "AUTO".

Figure 3:
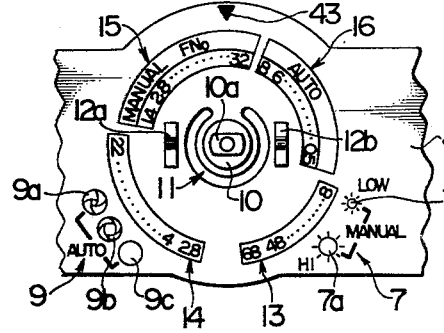

The camera 3 is of a conventional design, and in addition to the hot shoe 3a, includes a film winding knob 3b, a shutter button 3c a shutter dial 3d and a film rewind lever 3J. Located on the rear surface of the camera 3 is an eyepiece 3f. It is to be noted that the camera 3 internally houses a light receiving element which receives reflected light from a shutter blade or film surface. The first stationary display panel 4 is centrally provided with a shaft 10 having an end portion of square section 10a, as shown in FIGS. 2 and 3, and disposed in surrounding relationship with the shaft 10 are an arcuate slot 11 concentric with the shaft 10 as well as a pair of leaf springs 12a, 12b which form part of a click stop mechanism.

A guide number dial 13 for use in a manual control mode is disposed on the display panel 4 at a position intermediate the indicia 7 and the shaft 10, and a diaphragm aperture dial 14 for use in an automatic control mode is disposed on the panel 4 intermediate the indicia 9 and the shaft 10. These dials 13, 14 are concentric with the shaft 10. A diaphragm aperture dial 15 for manual control and a range dial 16 for automatic control are located in concentric relationship with the shaft 10 and at positions which are symmetrical to the dials 13, 14, respectively, with respect to the axis of the shaft 10. An index 43 indicative of the TTL control is located above the diaphragm aperture dial 15, as viewed in FIG. 3.

Figure 7:
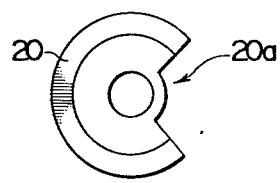
FIGS. 3 to 7 are plan views of a first stationary display panel, a first mask plate, a second mask plate, a second stationary display panel and a third mask plate, respectively.
Figure 2:
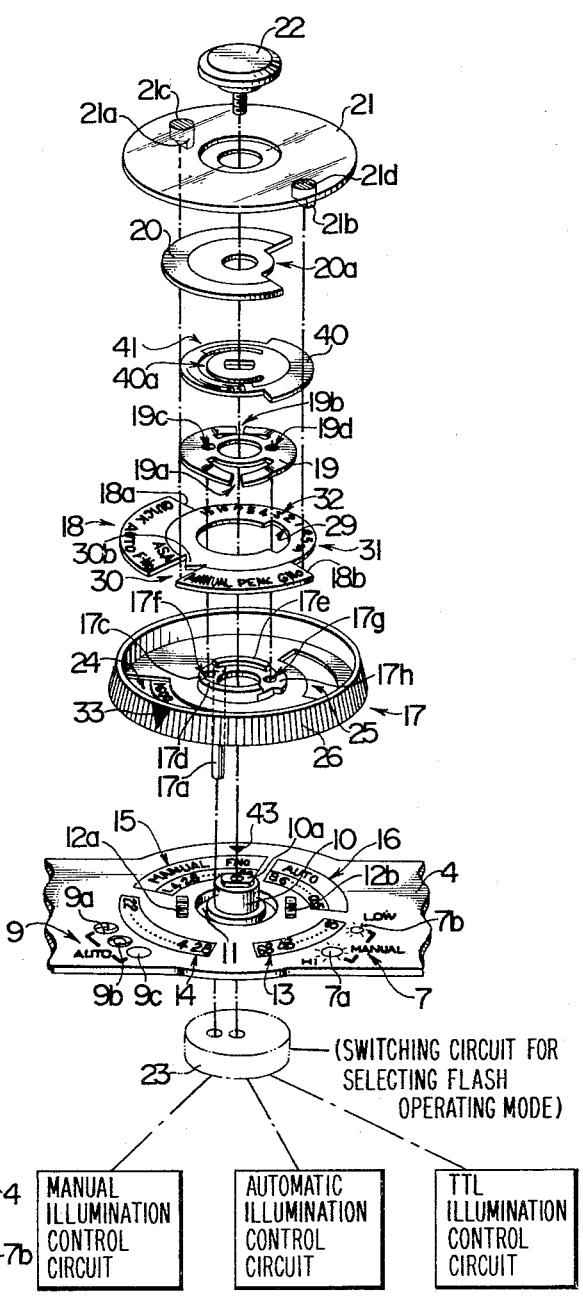
FIG. 2 is an exploded, perspective view of the data display.

As shown in FIG. 2, a first mask plate 17, a second mask plate 18 and a frictional coupling leaf spring 19 are fitted on the shaft 10 in the sequence named, and then a second stationary display panel 40 is fixedly mounted on the square end 10a of the shaft. Subsequently, a third mask plate 20 (see FIG. 7) is fitted on the shaft 10 for integral rotation with the first mask plate 17. An operating wheel 21 for the second mask plate 18 is fitted on top of the third mask plate 20, and the various members are locked against withdrawal by a set screw 22 which threadedly engages shaft 10.

As will be noted from FIG. 2, the first mask plate 17 carries an operating limb 17a which depends downwardly from the lower surface thereof, the limb being fitted into the slot 11 when the mask plate is fitted on the shaft 10. A switch operating member 23 of a suitable design, indicated in phantom line, is fixedly connected to the limb 17a.

Figure 4:
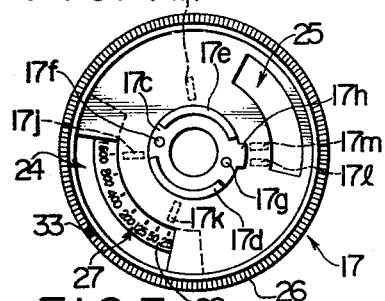

The first mask plate 17 has a hub 17c, on the upper surface of which are formed a pair of arcuate projections 17d, 17e (see FIG. 4) for locking the leaf spring 19, and a pair of openings 17f, 17g are formed intermediate the projections 17d, 17e for receiving set screws which are used to secure the leaf spring 19. The hub 17c is also formed with a projection 17h which locks the second mask plate 18 against rotation.

Adjacent to its periphery, the first mask plate 17 is formed with a first display window 24 and a second display window 25 at positions which are substantially symmetrical to each other with respect to the axis thereof. The window 24 serves to selectively display the diaphragm aperture dial 14 for automatic control and the guide number dial 13 for manual control while the second window 25 serves to selectively display the range dial 16 for automatic control and the diaphragm aperture dial 15 for manual control. A turning wheel 26 for operating the data display 1 is formed around the peripheral surface of the first mask plate 17 as by knurling. A film speed presetting dial 27 having a scale corresponding to that of the diaphragm aperture dial 14 for automatic control or corresponding to the guide number dial 13 for manual control is disposed adjacent to the inner edge of the display window 24 of the first mask plate 17 by securing a dial plate 28 to the bottom surface of the mask plate 17.

Figure 5:
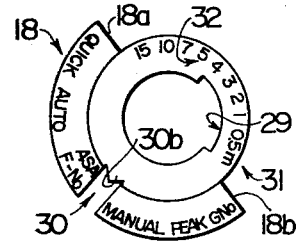

As shown in FIGS. 2 and 5, the second mask plate 18 has its central portion formed with an arcuate notch 29 for fitting engagement with the projection 17h on the first mask plate 17. At a position substantially diametrically opposite to the notch 19, the mask plate 18 is formed with a display window 30 for displaying one of the numerals on either the diaphragm aperture dial 14 or the guide number dial 13. The edge 30b which defines the inner extremity of the window 30 is chevron-shaped so as to clearly indicate (i.e. point to) a particular numeral which appears in the window 30. At a position which is substantially diametrically opposite window 30, the outer periphery of the second mask plate 18 is removed in an arcuate form to provide a notch 31 which serves to selectively expose the range dial for automatic control 16 or the diaphragm aperture dial 15 for manual control. A range dial 32 is formed along the marginal edge which adjoins the notch 31.

Referring to FIG. 2, the leaf spring 19 is formed with a pair of notches 19a, 19b and a pair of openings 19c, 19d which allow set screws to pass therethrough. After the second mask plate 18 is fitted over the hub 17c of the first mask plate 17, circumferential portions of the notches 19a, 19b are fitted over the projections 17d, 17e on the hub 17c, and the openings 19c, 19d aligned with the openings 17f, 17g formed in the first mask plate 17 for allowing set screws to be passed therethrough. In this manner, the second mask plate 18 is frictionally coupled to the first mask plate 17 by means of the leaf spring 19.

Figure 6:
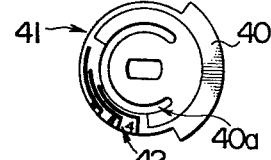

The second stationary display panel 40, shown in FIGS. 2 and 6, is fitted on the square end 10a of the shaft 10 which is fixedly mounted on the first stationary display panel 4. The periphery of display panel 40 is formed with an arcuate notch 41 for exposing the range dial 32 on the second mask plate 18 during the manual and TTL control. On its upper surface, the display panel 40 carries a dial 42 which during the TTL control, cooperates with the range dial 32 to indicate a range of the distance over which a picture can be taken for a given diaphragm aperture. The third mask plate 20 (see FIG. 7) is disposed on top of the second display plate 40, and is formed with a notch 20a which serves to expose only the dial 42.

Additionally, the operating wheel 21 associated with the second mask plate 18 is fitted on the shaft 10 (see FIG. 2). Operating wheel 21 is formed of a transparent plastic material, and is formed with a pair of operating projections 21a, 21b which depend downwardly from the lower surface thereof for engagement with notched edges 18a, 18b of the second mask plate 18. A pair of finger pieces 21c, 21d are provided on the upper surface of the operating wheel 21 in alignment with the operating limbs 21a, 21b.

After the first mask plate 17, second mask plate 18, leaf spring 19, second stationary display panel 40, third mask plate 20 and operating wheel 21 are disposed on the first stationary display panel 4 in the manner mentioned above, a locking screw 22 is engaged with the shaft 10 for locking these members against withdrawal. The projections 17d, 17e extend through a central opening in the mask plate 18, notches 19a, 19b and an arcuate slot 40a in the second display panel 40 to be integrally coupled with the lower surface of the third mask plate 20. The turning wheel 26 of the first mask plate 17 is provided with an index 33, which may be brought into alignment with the index 43 indicating a TTL control, the indicia 7 representing the light output levels for manual control or the indicia 9 indicating the light output levels for automatic control when the strobo unit to be operated in one of the automatic, manual and TTL control mode respectively.

The data display 1 according to the invention may be used in the following manner:

(A) Selection of a film speed

The operating wheel 21 may be turned by engaging the index finger and the middle finger with the finger pieces 21c, 21d thereof. A rotation of the operating wheel 21 results in turning the second mask plate 18 relative to the first mask plate 17. The extent of rotation of the second mask plate 18 is limited by the engagement between the notch 29 formed in the second mask plate and the projection 17h on the first mask plate 17 so as to coincide with the extent of the film speed presetting dial 27. The film speed presetting dial 27 carries a scale of numerals corresponding to values 25 to 1600 (see FIG. 4) according to ASA sensitivity, for example. As the second mask plate 18 is rotated, these numerals enter one by one into the display window 30. The rotation of the second mask plate 18 may be stopped when a numeral indicative of the sensitivity of a particular film which is loaded into the camera 3 appears through the window 30. FIGS. 8 to 12 illustrate a film speed of ASA 100.

(B) Selection among TTL, automatic and manual controls

The turning wheel 26 of the first mask plate 17 is held between fingers to turn it about the shaft 10 until the index 33 is located in alignment with the index 43 for TTL control, whereupon the TTL control is selected. When the index 33 is brought into alignment with one of the indicia in indicia 9 for automatic control, the automatic control mode is selected. Alternatively, when the index 33 is brought into alignment with one of the indicia in indicia group 7 for manual control, the manual control mode is selected. It will be noted that the indicia group 9 includes a high setting 9a, a medium setting 9b and a low setting 9c while the indicia group 7 includes a high setting 7a and a low setting 7b. As indicated in phantom line in FIG. 4, the lower surface of the first mask plate 17 is formed with recesses 17i to 17m, which are successively engaged by the springs 12a, 12b as the index 33 is moved into alignment with one of the indicia 43, 9a, 9b, 9c, 7a or 7b, thus providing a click stop mechanism for the first mask plate 17.

When the first mask plate 17 is rotated to bring the index 33 into alignment with one of the indices 43, 9 and 7, the switch operating member 23 (see FIG. 2) operates to switch an internally housed electrical circuit, not shown. It is one of the features of the invention that the electrical circuit is automatically switched as a particular control mode is selected. Specifically, when the index 33 is aligned with one of the indicia in group 9, an electrical circuit including a light receiving element which is disposed on the front surface of the strobo unit 1 for determining the intensity of an external light is turned on in order to control the duration of the flash from the strobo unit. When the index 33 is aligned with one of the indicia in group 7, the electrical circuit including the light receiving element is turned off, and instead a strobo illumination circuit is turned on, whereupon the duration of the flash from the strobo unit may have a given time interval which is either one of the high and low levels. Finally, when the index 33 is aligned with the index 43, another electrical circuit including a light receiving element which is disposed within the camera for determining reflected light from a shutter blade or a film surface is turned on in order to control the duration of the flash from the strobo unit.

Figure 8:
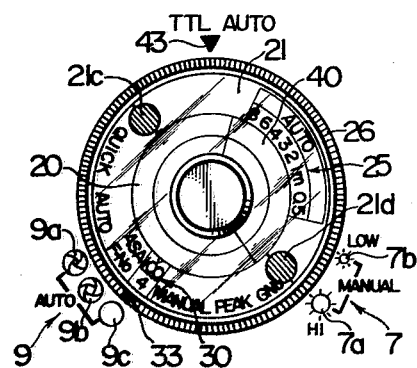
FIGS. 8 to 12 are plan views illustrating the manner of displaying data in the apparatus of the invention.

(C) Reading of data such as diaphragm aperture (i) FIG. 8 shows the index 33 aligned with the low setting 9c for the automatic mode. A diaphragm aperture of "4" is indicated within the display window 30. This dictates a user of the camera a corresponding setting of the diaphragm aperture. The display window 25 presents an indication "AUTO" and also all of the numerals ranging from 0.5 to 8m, which indicate that an object located at distance within this range can be photographed. Thus, the camera 3 may be focussed onto an object located within such range, and the shutter dial 3d aligned with the X contact to take a picture under the illumination of the auto strobo upon shutter release.

Figure 9:
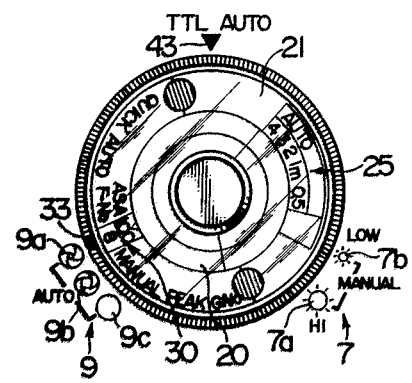

(ii) FIG. 9 shows the index 33 aligned with the high setting 9a for the automatic mode. The display window 30 indicates a diaphragm aperture of "8" while the display window 25 indicates numerals from 0.5 to 4m, indicating that a picture can be taken within such range with a reduced diaphragm aperture than the preceding instance. It is to be noted that in the instances (i) and (ii), the range dial 32 for manual control is covered by the third mask plate 20.

Figure 10:
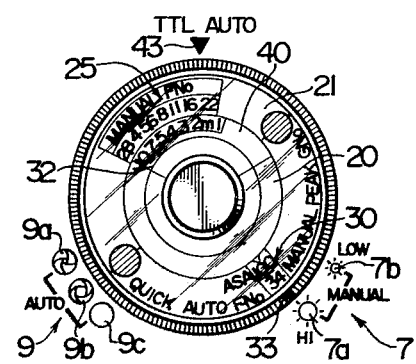

(iii) FIG. 10 shows the index 33 aligned with the high setting 7a for the manual mode. The display window 30 indicates one of the numerals from 8 to 68 on the guide numeral dial 13 for manual control, specifically "34". The display window 25 presents an indication of "MANUAL" and numerals from 2.8 to 22 on the diaphragm aperture dial 15 for manual control, which inclusively covers a range from 1.4 to 22. Presented in juxtaposition with these values of diaphragm aperture 2.8 to 22 are numerals 1 to 10m, which represent a portion of the numerals 0.5 to 15m on the range dial 32 for manual control (see FIG. 5) which is exposed through the third mask 20. These indicate combinations of the factors forming the guide number 34, namely, the diaphragm apertures and the distances within which a picture can be taken. Any one combination may be chosen to operate the camera 3 accordingly.

Figure 11:
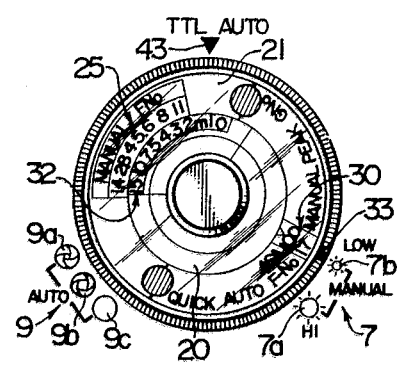

(iv) FIG. 11 shows the index 33 aligned with the low setting 7b for manual control. The display window 30 indicates a guide number "17". The display window 25 indicates diaphragm apertures of from 1.4 to 11 while the range dial 32 for manual control indicates numerals from 1 to 10m. Thus, a combination of a diaphragm aperture from 1.4 to 11 and a distance from 1 to 10m may be chosen to yield the guide number "17" in order to take a picture.

Figure 12:
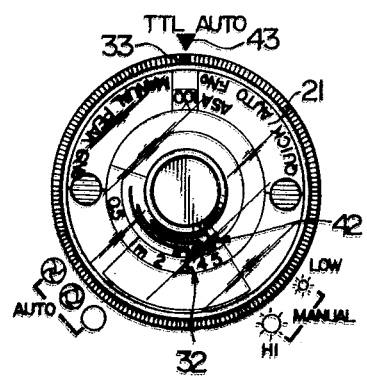

(v) FIG. 12 shows the index 33 aligned with the TTL index 43. While in the instances (i) to (iv), the range dial 42 for the TTL control has been covered by the third mask 20, it is exposed through the notch 20a in the third mask 20 in the instance (v). Also the range dial 32 is exposed. By reading the dials 42 and 32 in combination, it will be noted that for a diaphragm aperture of "4", the TTL control is possible within a range from 0.8 to 7m while for a diaphragm aperture of "8", the TTL control is possible in a range from 0.5 to 4m. When the diaphragm aperture of "16" is employed, the TTL control is possible in a range from 0.3 to 2m. In this instance, the TTL controlling device within the strobo unit 2 is connected through the hot shoe 3a with the light receiving element which is disposed within the camera for determining reflected light from a shutter blade or a film surface, while the other light receiving element which determines the intensity of an external light is placed in its quiescent state.

As discussed above, the invention enables the electrical circuit to be automatically changed as the automatic, manual and TTL control is selected, and simultaneously therewith related data is rapidly displayed without requiring any further calculation, thus facilitating the automatic, manual and TTL control of the strobo unit.

It is to be understood that in the apparatus of the invention, the location of the various dials can be interchanged. As mentioned above, while the second mask plate is rotatable relative to the first mask, it rotates as the first mask plate rotates. Any suitable means other than that shown in the embodiment can be employed for such connection, as is means for driving the second mask plate relative to the first mask plate. In addition, the number of the light output levels during the automatic or manual mode can be either increased or decreased, as desired.

What is claimed is:

1. An exposure indicator for a strobo unit which includes a manual controlling device for manually controlling the illumination of the strobo unit, an automatic controlling device for controlling the illumination by means of a light receiving element which determines an external light, and a TTL controlling device for controlling the illumination by means of a second light receiving element which is disposed within a camera for photometry of light incident to the camera through its lens system; the exposure indicator comprising a first stationary display panel (4) carrying a diaphragm aperture dial (15) and a guide number dial (13) for manual control, a diaphragm aperture dial (14) and a range dial (16) for automatic control, and a plurality of indicia (7,9,43) for indicating selection of a manual, an automatic or a TTL control, all disposed in interrelated and concentric relationship, a second stationary display panel (40) disposed in concentric relationship with said first stationary display panel (4) and carrying a range dial (42) for indicating a range of distances within which a picture can be taken during the TTL control mode, a first mask plate (17) disposed to be rotatable and in concentric relationship with said first stationary display panel (4) and carrying a film speed presetting dial (27) and having a pair of display windows (24,25) formed therein for selectively exposing said dials (13, 14; and 15, 16) on said first stationary display panel, a second mask plate (18), frictionally connected to said first mask plate (17) and rotatable together with said first mask plate (17) as said first mask plate (17) rotates over a given angle, said second mask plate (18) being formed with a notch (31) for selectively exposing said diaphragm aperture dial (15) for manual control and said range dial (16) for automatic control, the second mask plate (18) carrying a range dial (32) located adjacent to said notch (30) and which can be selectively brought into alignment with said diaphragm aperture dial (15) for manual control on said first stationary display panel (4) or said range dial (42) on said second stationary display panel (40), said second mask plate (18) being formed with a display window (30) for selectively displaying one of the numerals on said film speed presetting dial (27) of said first mask plate (17) and one of the numerals on said diaphragm aperture dial (14) for automatic control and on said guide member dial (13) for manual control on said first stationary display panel (4), and a third mask plate (20) disposed for integral rotation with said first mask plate (17) and having a display window (20a) formed therein for exposing said range dial (42) on said second stationary display panel (40).

2. An exposure indicator according to claim 1 in which a switch operating member (23) is associated with said first mask plate (17) for integral rotation therewith, said switch operating member (23) cooperating with said first mask plate (17) to provide a switching of electrical circuits for effecting one of the manual, automatic and TTL controls.

* * * * *